Patented Feb. 6, 1951

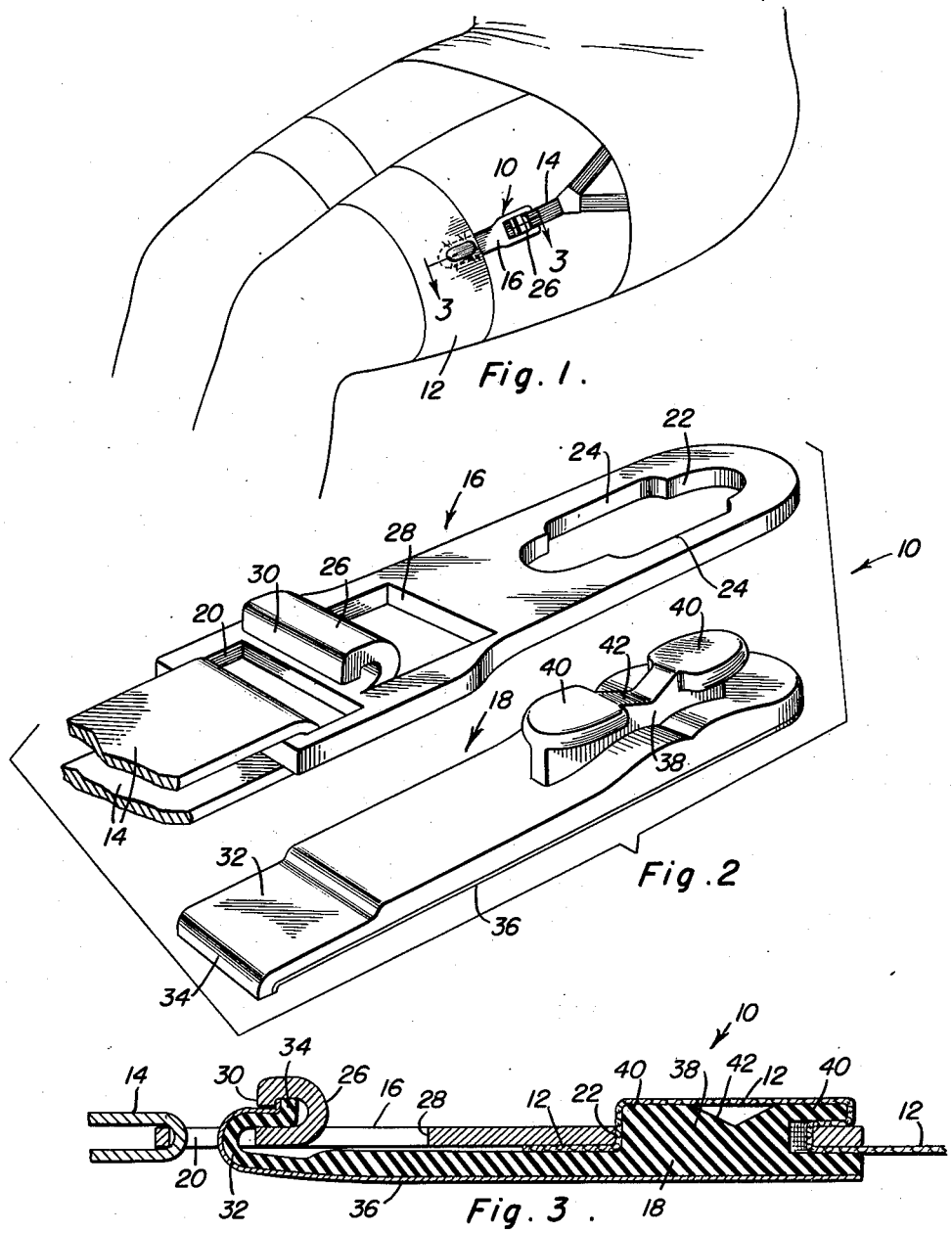

2,540,516

UNITED STATES PATENT OFFICE 2,540,516

HOSE SUPPORTER

Mark A. Glasco, Middletown, Ohio

Application April 5, 1948, Serial No. 19,001

1 Claim. (Cl. 24—245)

This invention relates to new and useful improvements and structural refinements in hose supporters, and the principal object of the invention is to support ladies' or men's hose in a firm and secure manner without damaging the hose itself.

Conventional hose supporters or garter fasteners, as they may be called, depend considerably upon the downward pull of the hose for maintaining them in a proper retaining position, but the important feature of the instant invention resides in its ability to firmly engage the hose, independently of any pull on the hose, either gravitational or otherwise.

Another feature of the invention resides in the provision of a hose supporter including a female keeper member formed with an opening and a coacting male keeper member provided with a pair of hose-engaging knobs connected by a distortable web, matters being so arranged that upon distortion of the web, the knobs may be applied to or removed from the opening.

A further feature of the invention resides in the formation of an additional slot or opening in the female keeper member and in the provision of a detent adjacent the opening, the male keeper member being formed from flexible material and one end portion thereof being insertable in said slot and engageable with the detent, whereby the two members are movably connected together.

With the above more important objects and features in view and such other objects and features as may become apparent as this specification proceeds, the invention consists essentially of the arrangement and construction of parts as illustrated in the accompanying drawings, in which:

Figure 1 is a perspective view showing the invention applied to a hose;

Figure 2 is a group perspective view of the two components of the invention; and Figure 3 is a cross sectional view, taken substantially in the plane of the line 3—3 in Figure 1.

Like characters of reference are employed to designate like parts in the specification and throughout the several views.

Referring now to the accompanying drawings in detail, the invention consists of a hose supporter designated generally by the reference character 10, the same being intended for fastening the upper portion of a hose 12 to a garter strap 14 and embodying in its construction a pair of keeper members, namely, a female keeper member 16 and a male keeper member 18.

The female keeper member 16 is elongated and is of rigid construction, one end portion thereof being provided with a transverse slot 20 through which the garter strap 14 may be looped, as will be clearly apparent.

The remaining end portion of the female member 16 is formed with a longitudinally elongated opening 22, the lateral sides of which are recessed along an intermediate portion of their length, as indicated at 24. In other words, the intermediate portion of the opening 22 is of somewhat greater width with respect to its end portions, as is best shown in Figure 2.

A hook-shaped detent 26 is struck out from the intermediate portion of the female member 16, leaving an additional opening 28 in the female member, substantially as shown. The detent 26, already described as being hook-shaped, is of a U-shaped cross sectional configuration and the free end portion thereof is inturned, as at 30. It is also to be noted that the detent 26 is disposed immediately adjacent the aforementioned opening or slot 20 and extends in parallelism therewith.

The male member 18 is formed from flexible, resilient material such as rubber, or the like, one end portion thereof being reduced in thickness as at 32, and terminating in a laterally projecting flange 34. The portion 32 of the member 18 is insertable in the slot 20 and engageable with the detent 26, the flange 34 being retained in position in the detent by means of the inturned portion 30 of the detent, whereby the two members 16, 18 are movably connected together.

If desired, the under surface of the male member 18 which, when the supporter is in use, engages the skin of the user, may be provided with a suitable padding strip 36 for obvious reasons.

The free end portion of the male member 18 is formed integrally with a longitudinally extending, distortable web 38, the end portions of this web terminating in integrally formed, enlarged knobs 40, while the mid portion of the web is notched or relieved, as at 42, so as to substantially enhance its adaptability to distortion.

When the invention is placed in use, the members 16, 18 are connected together, as has already been described, and are attached to the garter strap 14, whereupon the supporter is applied to the hose 12 by simply placing the upper end portion of the hose over the knobs 40.

The web 38 is then distorted or compressed by twisting or urging the two knobs 40 together, so that they may be passed through the enlarged portions 24 into the opening 22. As soon as the distorting or twisting force is relaxed, the web 38 and the knobs 40 will, of course, assume their normal relative position in the opening 22 with the hose being firmly interposed and engaged by the knobs as shown in Figure 3.

In this manner, the supporter will firmly and securely engage the hose, regardless of any force, gravitational or otherwise, which may exist in the hose itself.

Needless to say, the supporter may be disengaged from the hose by simply reversing the procedure above described.

It is believed that the advantages and use of the invention will be clearly apparent from the foregoing disclosure, and accordingly, further description thereof at this point is deemed unnecessary.

Having described the invention, what is claimed as new is:

In a hose supporter, the combination of an elongated female member formed from relatively rigid material and provided in one end portion thereof with an elongated opening having substantially semi-circular end portions and a straight-edged intermediate portion of a width greater than the diameter of said semi-circular end portions, a male member formed from resilient material positioned under said female member, an elongated web provided on one end portion of the male member and having a sectionally reduced intermediate portion providing a region of lesser resistance to bending, a pair of mutually spaced heads provided on the end portions of said web, one of said heads terminating flush with the adjacent end of the web, the remaining head extending beyond the adjacent end of the web and constituting a projecting tongue, said male member being transversely bendable in the intermediate region of said web whereby said heads may be passed through said opening to engage the upper surface of the female member and frictionally retain a stocking therebetween, and means at the remaining end of said male and female members for connecting the same together.

MARK A. GLASCO.

REFERENCES CITED

The following references are of record in the file of this patent:

UNITED STATES PATENTS

| Number | Name | Date |
|---|---|---|
| 1,183,903 | Orewiler | May 23, 1916 |
| 1,426,635 | Hawie | Aug. 22, 1922 |
| 1,426,636 | Hawie | Aug. 22, 1922 |
| 1,475,868 | Peterson et al. | Nov. 27, 1923 |
| 1,832,548 | Hazelton | Nov. 17, 1931 |
| 2,043,751 | Hawie | June 9, 1936 |

FOREIGN PATENTS

| Number | Country | Date |
|---|---|---|
| 457,847 | Great Britain | Dec. 7, 1936 |